United States Patent [19]

Doi et al.

[11] 4,356,564

[45] Oct. 26, 1982

[54] DIGITAL SIGNAL TRANSMISSION SYSTEM WITH ENCODING AND DECODING SECTIONS FOR CORRECTING ERRORS BY PARITY SIGNALS TRANSMITTED WITH DIGITAL INFORMATION SIGNALS

[75] Inventors: Toshitada Doi, Kanagawa; Shunsuke Furukawa, Tokyo; Kenji Nanba, Kanagawa, all of Japan

[73] Assignee: Sony Corporation, Tokyo, Japan

[21] Appl. No.: 123,721

[22] Filed: Feb. 22, 1980

[30] Foreign Application Priority Data

Feb. 27, 1979 [JP] Japan ................................ 54-22460

[51] Int. Cl.³ ............................................ G06F 11/10
[52] U.S. Cl. ..................................................... 371/40
[58] Field of Search ........................ 371/38, 39, 40, 44, 371/45; 360/38, 53

[56] References Cited

U.S. PATENT DOCUMENTS

| 3,409,875 | 11/1968 | Jager et al. ............................ 371/8 |
| 3,582,881 | 6/1971 | Burton ................................. 371/40 |
| 3,775,746 | 11/1973 | Boudreau et al. .................... 371/39 |
| 3,781,795 | 12/1973 | Zegers ................................. 371/39 |
| 4,206,440 | 6/1980 | Doi et al. ............................. 371/39 |
| 4,211,997 | 7/1980 | Rudnick et al. ..................... 371/40 |
| 4,238,852 | 12/1980 | Iga et al. ............................. 371/40 |

FOREIGN PATENT DOCUMENTS 54-139406 10/1979 Japan ...................................... 371/45
2012460 7/1979 United Kingdom .................. 371/40

OTHER PUBLICATIONS

T. Doi et al., A Long-Play Digital Audio Disk System, Journal of the Audio Engineering Society, 1979 Dec., vol. 27, No. 12, pp. 975–981.

*Primary Examiner*—Charles E. Atkinson
*Attorney, Agent, or Firm*—Lewis H. Eslinger; Alvin Sinderbrand

[57] ABSTRACT

In a digital signal transmission system in which interleaved sequences of digital words are transmitted on respective channels, the words in each sequence are added bit-by-bit in a first modulo-two adder to produce a first parity signal, the latter and selected ones of the sequences of digital words have imparted thereto different respective delay times, and then the sequences of digital words and the first parity signal are added bit-by-bit in a second modulo-two adder to produce a second parity signal. The second parity signal is delayed a predetermined amount and fed back to the first modulo-two adder. Then, the interleaved sequences of digital words and the first and second parity signals are serially transmitted on a transmission medium, which can be a video tape. The transmission system is capable of correcting burst errors occurring in more than three successive digital words.

10 Claims, 11 Drawing Figures

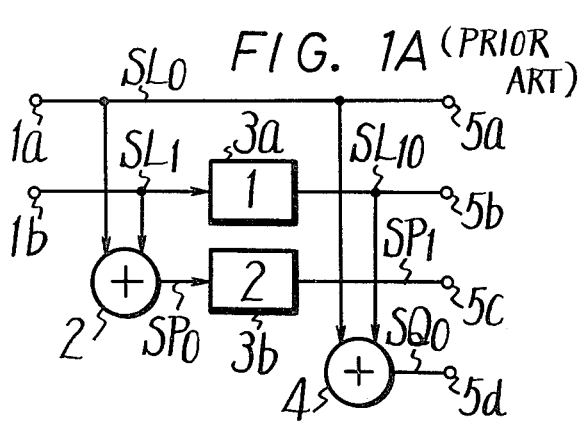
FIG. 1A (PRIOR ART)
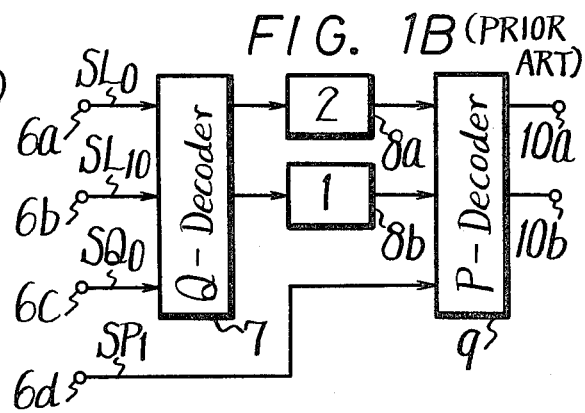
FIG. 1B (PRIOR ART)
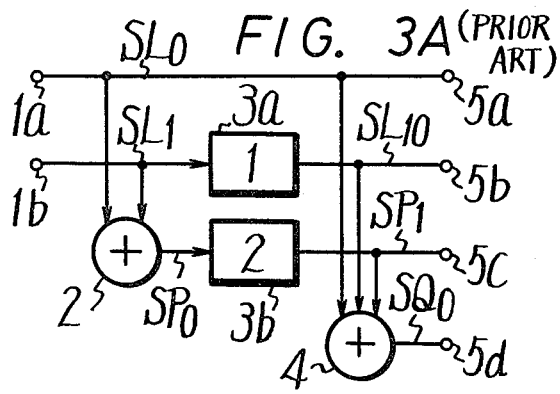
FIG. 3A (PRIOR ART)
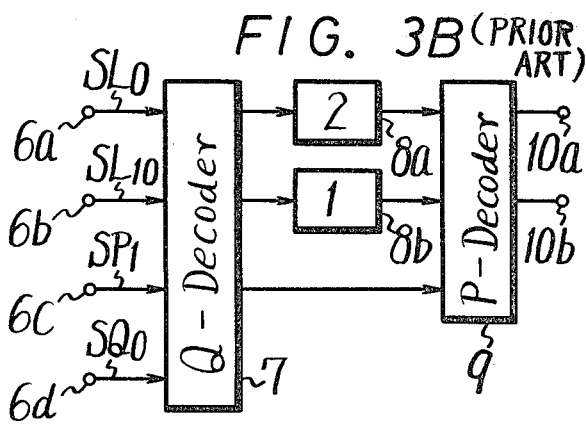
FIG. 3B (PRIOR ART)
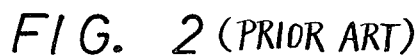
FIG. 2 (PRIOR ART)
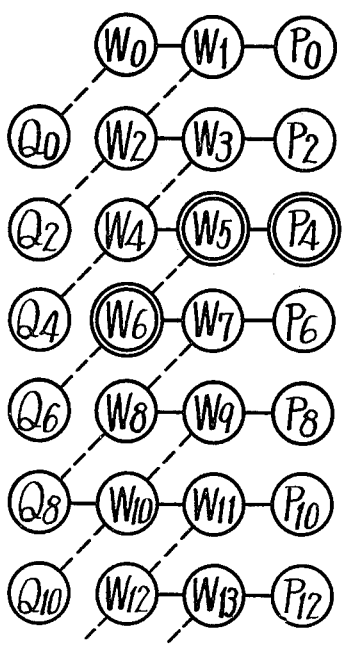
FIG. 4 (PRIOR ART)
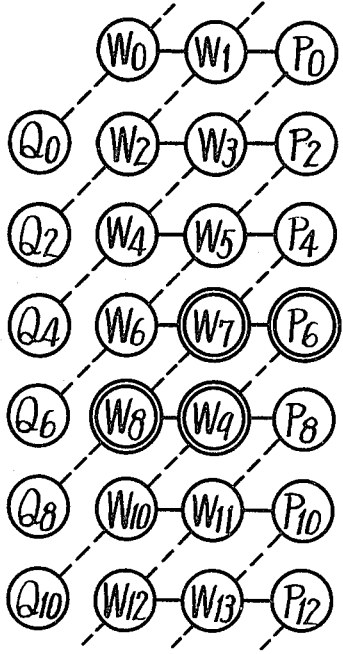

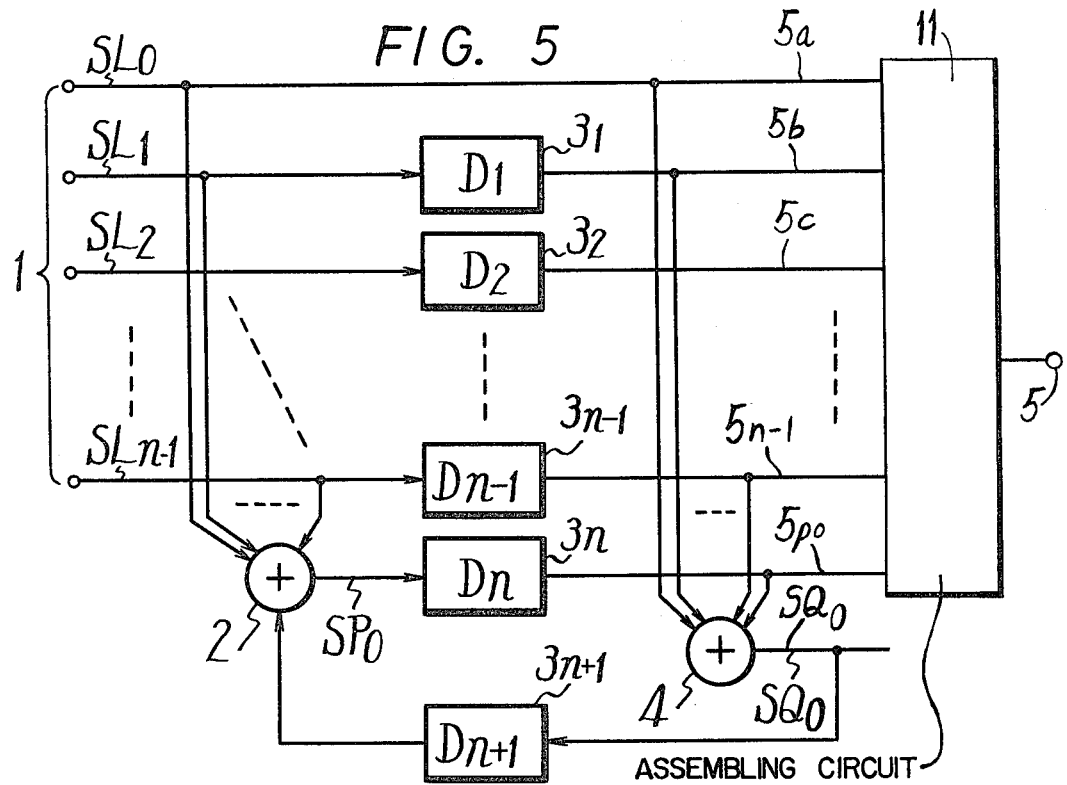
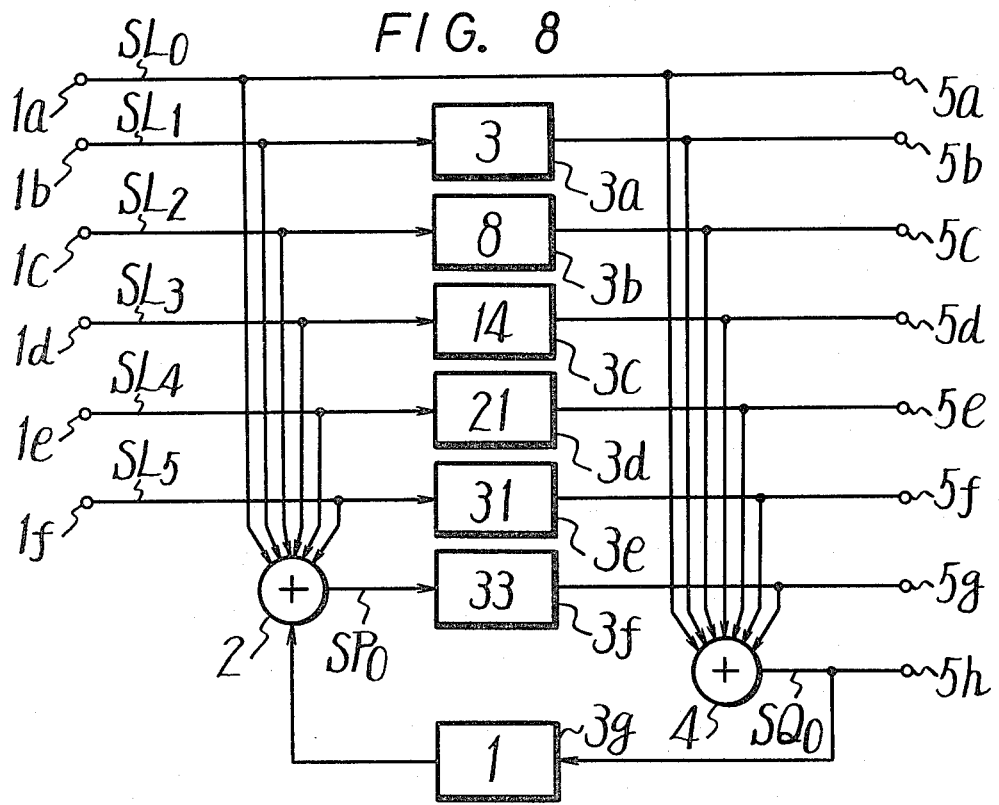

DIGITAL SIGNAL TRANSMISSION SYSTEM WITH ENCODING AND DECODING SECTIONS FOR CORRECTING ERRORS BY PARITY SIGNALS TRANSMITTED WITH DIGITAL INFORMATION SIGNALS

BACKGROUND OF THE INVENTION

1. Field of the Invention

The present invention relates to a digital signal transmission system, and in particular is directed to a system for transmitting digital information signals on a transmission medium, such as a magnetic tape or microwave line on which the digital signal is subjected to disturbances causing burst errors, and for enabling correction of the errors which occur in the received digital signal.

2. Description of the Prior Art

Recently, it has been proposed to record a digital information signal, such as an audio PCM signal, on a magnetic tape by using a video tape recorder. However, it is well known that drop-outs which can cause a burst error, frequently occur in the digital signal reproduced from the tape. Several types of transmission systems are available in the art to correct such a burst error occurring in the reproduced PCM signal. One such system is shown in U.S. Pat. No. 3,409,875. In that system, the PCM signal is transmitted through two lines, one of which introduces a predetermined amount of delay. In the receiving side, the outputs of the lines are selectively applied to an output device through a switch controlled by an error responsive device. The latter is responsive to unequal signals at the outputs of the lines, so that upon detection of the unequal signals the switch is connected for a predetermined time to the line on which the signal is delayed. Thus, the system can correct the burst errors appearing in the line. However, because it is necessary in the above system to provide the two lines for transmission of the same signal, the required capacity of the transmission medium is double the capacity of a system that does not correct burst errors.

In order to overcome the above-described disadvantage, there has been proposed an improved digital signal transmitting system, such as that described in application Ser. No. 06/086,677, filed Oct. 19, 1979, and assigned to the same assignee as the present invention. In that system, a plurality of words of digital information signals are added bit by bit in a modulo-two adder and a first parity signal is generated for the predetermined number of words of each succession of a digital information signals. Each word of the information digital signals and each parity signal are delayed by respectively different amounts. The information signals and the first parity signal thus delayed are added bit by bit in a modulo-two adder to generate a second parity signal for the information and parity signals, and then the predetermined number of words of digital information signals and the first and second parity signals are serially transmitted on a transmission line.

According to this previously proposed system, if errors are introduced in the digital information signals during transmission, it is possible to correct such errors perfectly, so long as the errors are contained in not more than three words of the information signals. However, it is impossible to correct errors included in more than three words of the information signals by the digital signal transmission system of the prior application.

OBJECTS AND SUMMARY OF THE INVENTION

An object of the invention is to provide an improved digital signal transmission system in which burst errors contained in the transmitted signal can be corrected at the receiving side.

Another object of the invention is to provide a new system for transmitting digital signals together with parity signals which are composed from such digital signals, and for correcting burst errors in the transmitted digital signals by utilizing the parity signals.

A further object of the present invention is to provide an improved system with high correction ability for correcting errors contained in the transmitted signal.

According to an aspect of this invention, a digital signal transmission system comprises means for transmitting selected words of a digital signal on a first channel and the remaining words on at least one further channel; a first adder for adding a plurality of words of the digital signal to produce a first error-correcting signal; delay circuitry for delaying the remaining words of the digital signal by one amount and for delaying the first error correcting signal by another amount; a second adder for adding at least one of the delayed words and the delayed first error correcting signal to produce a second error correcting signal; a feedback circuit for feeding the second error correcting signal back to the first adder so that the latter adds the second error correcting signal together with the plurality of words of the digital signal to produce the first error correcting signal, and means for transmitting, together with the words of the digital signal, the first and second error correcting signals. The first and second adders can be modulo-two adders.

Other objects, features and advantages of the invention will become apparent from the following description taken in conjunction with the accompanying drawings throughout which the like references designate the same elements.

BRIEF DESCRIPTION OF THE DRAWINGS

FIGS. 1A and 1B are block diagrams of an encoder and decoder, respectively, of a previously proposed system;

FIG. 2 is a table which is used for the explanation of the system of FIG. 1;

FIGS. 3A and 3B are block diagrams of an encoder and decoder, respectively, of another previously proposed system;

FIG. 4 is another table which is used for the explanation of the system of FIG. 3;

FIG. 5 is a block diagram showing an embodiment of the encoder used in the system according to this invention;

FIG. 8 is a block diagram showing an embodiment of the encoder used in a further system according to this invention.

DESCRIPTION OF THE PREFERRED EMBODIMENTS

Figure 6A:
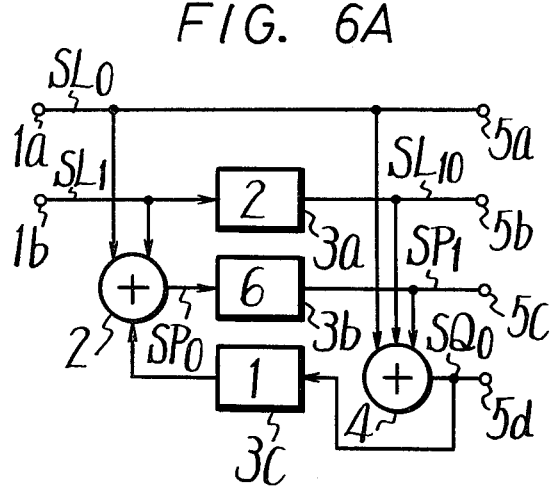
FIGS. 6A and 6B are block diagram showing embodiments of the encoder and decoder, respectively, used in another system according to this invention.

Before describing the present invention, the system of the above-mentioned application Ser. No. 06/086,677 will be explained.

FIGS. 1A and 1B show an encoder and a decoder, respectively, according to a system described in the prior application Ser. No. 06/086,677.

In FIG. 1A, $1a$ and $1b$ designate input terminals of an encoder which are respectively supplied with a sequence of words of pulses code modulated, or PCM signals. In this example, PCM signals ($W_0$, $W_1$, $W_2$, ...) of a single channel, which are produced by pulse code modulating an audio signal, are distributed into a sequence of PCM signals $SL_0$ consisting of even numbered words ($W_0$, $W_2$, $W_4$, ...) and a sequence of PCM signals $SL_1$ consisting of odd numbered words ($W_1$, $W_3$, $W_5$, ...). The sequence of PCM signals $SL_0$ and $SL_1$ are applied to the input terminals $1a$ and $1b$, respectively. The PCM signals in the sequence of PCM signals $SL_0$ and $SL_1$ are supplied word-by-word to a modulo-two adder 2. In the modulo-two adder 2, successive words are modulo-two added to form a sequence of first parity signals $SP_0$ as follows: $(W_0 \oplus W_1 = P_0)$; $(W_2 \oplus W_3 = P_2)$; ... and $(W_{2n} \oplus W_{2n+1} = P_{2n})$. The sequence of PCM signals $SL_0$ are provided, without any delay imparted thereto, to an output terminal $5a$ while the sequences of PCM signals $SL_1$ and the sequences of parity signals $SP_0$ are provided through a delay circuits $3a$ and $3b$, respectively, which impart a one word delay time and a a two word delay time, and these delayed signals are provided to output terminals $5b$ and $5c$, as a sequence of delayed PCM signals $SL_{10}$ and a sequence of delayed parity signals $SP_1$, respectively.

Each word of the PCM signals from the sequence of the PCM signals $SL_0$ and $SL_{10}$ is supplied to a modulo-two adder 4, in which a modulo-two adding operation of $(W_{2n} \oplus W_{2n-2+1})$ is performed to obtain a sequence of second parity signals $SO_0$.

The sequences of the PCM signals $SL_0$ and $SL_{10}$ and the sequences of the parity signals $SP_1$ and $SQ_0$ are applied to output terminals $5a$, $5b$, $5c$ and $5d$, respectively.

FIG. 1B shows a decoder complementary to the encoder shown in FIG. 1A. In FIG. 1B, input terminals $6a$, $6b$, $6c$ and $6d$ are supplied with the sequences of PCM signals $SL_0$, $SL_{10}$ and the sequences of second and first parity signals $SQ_0$, $SP_1$, respectively. The sequences of PCM signals $SL_0$, $SL_{10}$ and the sequences of second parity signals $SQ_0$ are supplied to a Q-decoder 7 in which the error correction by the second parity signals is carried out. The sequences of PCM signals $SL_0$ and $SL_{10}$ thus corrected by the parity signals are supplied through delay circuits $8a$ and $8b$ which impart delays of two words and of one word, respectively. The sequence of delayed first parity signals $SP_1$ is supplied to the P-decoder 9 so that the latter can effect error correction by means of the delayed first parity signal. The sequences of PCM signals $SL_0$ and $SL_1$ thus corrected are delivered to output terminals $10a$ and $10b$, respectively.

The above-described encoder and decoder are so formed that if errors occur in the digital signal, such errors can be independently detected in each word containing an error. Now, the error correction operation of the above-described encoder and decoder will be explained. Referring to FIG. 2, three words coupled through the solid lines form respective first parity signals, and three words coupled through the broken lines form respective second parity signals. Here it is assumed that the decoder of FIG. 1B is so constructed that the error is first corrected by the Q-decoder 7. Accordingly, if errors occur in one word in any three words coupled through the broken lines, any errors occurring in two or more words can be completely corrected. Further, even in the event that errors occur in more than two words in the three words coupled by the broken lines, so long as the other two words coupled by the solid lines with each of the error-containing words are correct, it is possible to correct all such errors. If three words, for example, $W_4$, $W_5$ and $W_6$ contain errors, the word $W_4$ is corrected by means of parity signal $Q_4$, but the two words $W_5$ and $W_6$ can not be corrected by the Q-decoder 7 and continue to contain errors. Therefore, the errors in words $W_5$ and $W_6$ have to be corrected in the P-decoder 9 by parity signals $P_4$ and $P_6$, respectively.

Incidentally, in the event that PCM signals of two words forming the second parity signals contain errors and also the first parity signal containing either of those two words of PCM signals contains errors, or in the event that three words contain errors, the correction of such errors is impossible. For example, in the event that three words $W_5$, $W_6$, $P_4$, which are indicated in FIG. 2 by double circles, contains errors, the word $W_5$ cannot be corrected when the Q-decoding is carried out first and then the P-decoding is carried out.

In order to enable the correction of errors occurring in any specific three words, an encoder and a decoder as shown in FIG. 3A and 3B, respectively, can be employed. That is, the second parity signals $Q_{2n}$ are formed by combining not only PCM signals but also first parity signals $P_{2n-4}$ and the decoder is able to correct the error in the first parity signals in the Q-decoder 7. According to the encoding system shown in FIG. 3A, since the first parity signals are also operated upon so as to form the second parity signals by combining the digital words as shown in FIG. 4 by the broken lines, three word errors in any positions can be corrected.

However, four word errors in four successive words, cannot be corrected. In other words, when the corrected result from the P-decoder 9 is not fed back to the Q-decoder 7, it is not possible to correct such errors, other than four word errors that can be corrected only by the first parity signal. Even if the decoder is so formed that the corrected result from the P-decoder 9 is fed back to the Q-decoder 7, when the shape formed by connecting four erroneous words in FIG. 4 constitutes a parallelogram, the correction of four word errors cannot be made. For example, when four words $W_7$, $W_8$, $W_9$, $P_6$ which are respectively marked with double circles in FIG. 4 contain errors, these errors can not be corrected by either of the Q-decoder 7 and P-decoder 9, even if the corrected result from the P-decoder 9 is fed back to the Q-decoder 7.

In contrast to the above-described encoder and decoder, the transmission system of the present invention successfully corrects errors, even if four words at any positions are erroneous, and further when five words are erroneous, their correction is also possible, dependent upon. the construction of the decoder.

An embodiment of the encoding system of the present invention will be described with reference to FIG. 5. n sequences of PCM signals $SL_0$ to $SL_{n-1}$ are distributed over channels by being supplied to n input terminals 1. In this case, the sequence of PCM signals $SL_0$ is transmitted, without any delay, through an output 5a to an assembling circuit 11, and the remaining (n−1) sequences PCM signals $SL_1$ to $SL_{n-1}$ are transmitted through delay circuits or lines $3_1$ to $3_{n-1}$ and through outputs $5_b$-$5_{n-1}$, respectively, to circuit 11. The amounts of delay imparted by delay lines $3_1$ to $3_{n-1}$ are respectively selected as $D_1, D_2, \ldots D_{n-1}$ where each delay $D_n$ is an integral number of word times. n words derived from the n respective sequences of PCM signals $SL_0$ to $SL_{n-1}$ are supplied to the modulo-two adder 2 which produces the sequence of first parity signals $SP_0$. This sequence of first parity signals $SP_0$ is furnished through a delay line $3_n$ which imparts an amount of delay Dn an integral number of word times to an output $5_{p0}$ leading to circuit 11. n+1 words representing the sequences of PCM signals appearing at output $5_{Q0}$ connected to assembling circuit 11 and also the sequence of first parity signals $SP_0$, are supplied to the modulo-four adder 4 which produces the sequence of second parity signals $SQ_0$. This sequence of second parity signals $SQ_0$ is furnished to an output $5_{Q0}$ connected to assembling circuit 11 and is also fed back through a delay line $3_{n+1}$ which imparts an amount of delay $D_{n+1}$ (an integral number of word times) to the adder 2.

In assembling circuit 11, an error detecting code is added to each word or to a set of words consisting of n PCM signals and two parity signals which appear simultaneously with the other signals at the outputs $5_a$-$5_{n-1}$, $5_{p0}$ and $5_{Q0}$. If the error detecting code is included in every one word, the error in each word can be perfectly detected at the receiving (reproducing) side, but on the other hand redundant degree that is, the density ratio of the transmitted (or recorded) signal increases. When an error detecting code is included for each several words, the redundant degree can be reduced, but if only one word in each set of plural words is erroneous, the remaining correct words are detected as erroneous words. It is, therefore, effective in the case where the error detecting code is included in each several words that the n+2 sequence of signals appearing at the outputs $5_a$-$5_{n-1}$, $5_{p0}$ and $5_{Q0}$ leading to assembling circuit 11 are suitably subjected in the latter to an interleaving process such that they are delayed at different delay times relative to one another at the output 5 of circuit 11 and an error detecting code is included for each several interleaved words. As the error detecting code, a CRC (cyclic redundancy check) code (error detection by a cycle code) or parity code may be used. Further, as the error correcting code, a full-precision (ordinary) adding code may be used in place of the modulo-two or modulo-four parity signal. In that event, adders 2 and 4 each become a full adder. Further, for forming parity signals, either of a parallel process (exclusive OR gate) or a series process (exclusive OR gate and shift register) may be used.

Now, the manner of selecting the amounts of delay or delay times $D_1, D_2, \ldots D_n, D_{n+1}$ of delay lines $3_1$ to $3_{n+1}$ will be described.

First, it is assumed that the delay times $D_1, D_2, \ldots D_n$ are selected to be larger with increasing n and the sequence of PCM signals $SL_0$ with no delay are taken as reference. The delay times $D_{n+1}$ may be equivalently taken as the delay time $-D_{n+1}$. The delay times for the respective signals are so selected that as to the series of differences of any adjacent delay times $(D_{n+1}-D_1, D_2-D_1, \ldots D_n-D_{n-1})$, the sum of any adjacent delay times is not equal to sum of other adjacent delay times. Further, in practice it is desirable to select the delay time $D_{n+1}$ (which will be the greatest) as small as possible in order to reduce the necessary capacity of a shift register and RAM (random access memory) which in practice form the delay line. If the delay times are selected as above, four words errors at any positions can be corrected. Depending upon the structure of the decoder, five words errors can be also corrected.

The above example of the present invention will be now described. FIG. 6A shows an embodiment of the encoder according to the invention in which sequences of PCM signals $SL_0$ and $SL_1$ are supplied in two channels to input terminals 1a and 1b, respectively. In this case, the delay time of a delay line 3a for the sequence of PCM signal $SL_1$ is selected as two word times, the delay time of a delay line 3b for the sequence of first parity signal $SP_0$ generated from the adder 2 is selected as six word times and the delay time of a delay line 3c inserted in the feedback loop from the adder 4 to the adder 2 is selected as one word time. In this case, the differences of the delay times is between adjacent channels follows the series (1, 2, 4). Though not shown, an error detecting code is added to the signals appearing at output terminals 5a, 5b, 5c and 5d of the encoder.

Figure 6B:
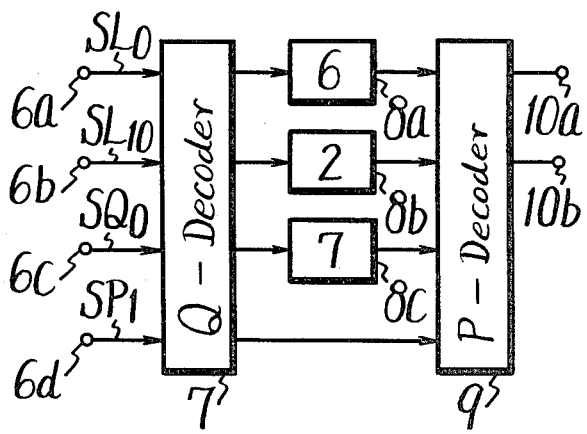

FIG. 6B shows an example of the decoder complementary to the above encoder. When signals are supplied to input terminals 6a, 6b, 6c, 6d of the decoder, to any error occurring in the signals is detected at that time by the error detecting code, and the detected result is represented by an error indicating bit added at every word. The sequences of PCM signals $SL_0$, $SL_{10}$ and the sequences of parity signals $SQ_0$, $SP_1$ fed to the input terminals 6a to 6d are all supplied to the Q-decoder 6. According to this invention, since the second parity signals $S_{Q0}$ are dependent upon the sequence of first parity signals $SP_1$, the second parity signal $S_{Q0}$ is also supplied to the P-decoder 9. It should be noted that it is necessary that the timings of four words forming the first parity signal coincide with the timing of the first parity signals. Therefore, delay lines 8a, 8b and 8c are provided for the sequences of PCM signals and the sequence of second parity signals delivered from the Q-decoder 7. The delay line 8c with the delay time of 7 word times is provided for the sequence of second parity signals $SQ_0$, the delay line 8a with the delay time of 6 word times is provided for the sequence of PCM signals $SL_0$, and the delay line 8b with the delay time of 2 word times is provided for the sequence of PCM signals $SL_{10}$.

According to this embodiment of the invention, when words $W_{2n}$ and $W_{2n+1}$ are respectively supplied to the input terminals 1a and 1b of the encoder shown in FIG. 6A, the adder 2 produces, the parity signal $P_{2n}$. Then, three words $W_{2n}, W_{2n+1-4}$ and $P_{2n-12}$ are produced at the output terminals 5a, 5b and 5c, respectively. Accordingly, parity signal $Q_{2n}$ is produced at the output terminal 5d by the modulo-two adding operation $(W_{2n} \oplus W_{2n+1-4} \oplus P_{2n-12} = Q_{2n})$. This parity signal $Q_{2n}$ is fed back through the delay line 3c to the adder 2 so that the parity signal $P_{2n}$ from the adder 2 is expressed as follows.

$$P_{2n} = W_{2n} \oplus W_{2n+1} \oplus Q_{2n-2}$$

At the time that the parity signal $P_{2n}$ is fed to the input terminal 6d of the decoder shown in FIG. 6B, words $(W_{2n+12}, W_{2n+1+8}$ and $Q_{2n+12})$ are respectively fed to the other input terminals 6a to 6c of the decoder.

Hence, a first syndrome $S_q$ is generated in the Q-decoder 7 by the following calculation.

$$P_{2n} \oplus W_{2n+12} \oplus W_{2n+1+8} \oplus Q_{2n+12} = S_q$$

In this case, the discriminating bit or error indicating signal added to each word is excepted from, and ignored in the calculation. When no error exists in any of the words, all the bits of the syndrome $S_q$ are "0". However when an error occurs in one word, since it corresponds to the error in the syndrome $S_q$, the error can be corrected by modulo-two adding the erroneous word and syndrome $S_q$.

Due to the delaying operation of delay lines 8a, 8b and 8c, words ($W_{2n}$, $W_{2n+1}$, $Q_{2n-2}$, $P_{2n}$) are simultaneously fed to the P-decoder 9. Hence, a second syndrome $S_q$ is generated in the P-decoder 9 by the following calculation.

$$W_{2n} \oplus W_{2n+1} \oplus Q_{2n-2} \oplus P_{2n} = S_q$$

When no error is presented in any of the words, all the bits of syndrome $S_q$ are "0". However, when an error exists in one word, since it corresponds to the error in the syndrome $S_q$, the error can be corrected by modulo-two adding the erroneous word and syndrome $S_q$.

Figure 7:
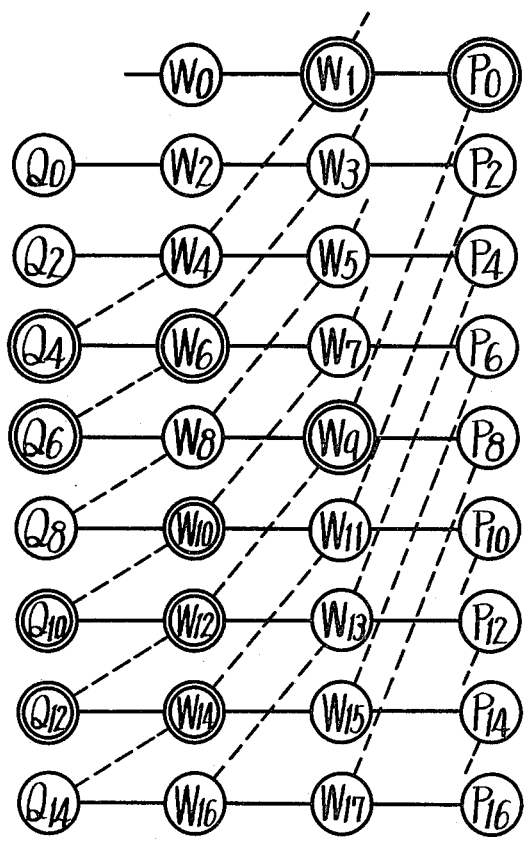
FIG. 7 is a table which is used for the explanation of the system of FIG. 6.

FIG. 7 is a table showing the relation among the respective words processed by the above example of the present invention. In the table of FIG. 7, the four words coupled by the solid lines in the horizontal direction form the syndrome $S_q$ by modulo-two addition with the first parity signals, and the four words coupled by the broken lines form the syndrome $S_q$ by modulo-two addition with the second parity signals.

As is apparent from the table of FIG. 7, it is possible to correct any four word errors, even if P- and Q-decoders 7 and 9 detect two word errors simultaneously. For example, in the event that the PCM signals $W_{2n}$ and $W_{2n+2}$ (for example, $W_{12}$ and $W_{14}$) are erroneous and the parity signals $Q_{2n}$ and $Q_{2n+2}$ (for example, $Q_{12}$ and $Q_{14}$) are erroneous, two word errors are presented for each of the parity signals $Q_{2n}$ and $Q_{2n+2}$ and also two word errors are presented for the parity signal $P_{2n+2}$. Nevertheless, even in such event, the corrected result from the P-decoder 9 can be used to correct words, $Q_{2n}$ or $W_{2n+2}$. Accordingly, it is possible to correct errors by using parity word $P_{2n+2}$ and hence the correction of any four word errors becomes possible.

The above ability to correct four word errors similarly enables five word errors to be corrected. Therefore, if the decoding system is constructed so that correction by means of the second parity signal is carried out a second time by using the corrected result of the P-decoder 9, the correction of any five word errors become possible.

Error correction according to the present invention will not be possible for six or more word errors, as that number of words cannot be independently corrected by either of first and second parity signals. For example, when six words ($P_0$, $W_1$, $Q_4$, $W_6$, $Q_6$, $W_9$), as marked with double circles in FIG. 7, all contain errors the correction thereof is impossible.

FIG. 8 is a block diagram showing another example of the encoder of the present invention which is to process the PCM signals occurring in six channels. In this example, sequence of six channel PCM signals $SL_0$ to $SL_5$ are fed to input terminals 1a to 1f, respectively. The sequences of PCM signals $SL_0$ to $SL_5$ are formed by pulse code modulating, for example, the left and right channel signals of a stereophonic audio signal and further distributing the PCM signals of each channel to three channels. In this example, the series of PCM signals $SL_0$ is transmitted directly (undelayed) to an output terminal 5a and the other series of PCM signals $SL_1$ to $SL_5$ are transmitted through delay circuits or lines 3a to 3e to output terminals 5b to 5f, respectively. The amount of delay imparted, or delay times (on integral number of word times) of the delay lines 3a to 3e are respectively selected as 3, 8, 14, 21 and 31 word times. The series of parity signals $SP_0$ derived from the adder 2 is delivered through a delay circuit or line 3f with a delay time of 33 word times to an output terminal 5g. The series of parity signals $SQ_0$ derived from the adder 4 is delivered to an output terminal 5h and also to the adder 2 through a delay circuit or line 3g with the delay amount or time of 1 word time. In this case, the series of differences of delay times are (1, 3, 5, 6, 7, 10, 2).

If the sequences of six channel PCM signals are encoded as set forth just above, the system will have a higher power to correct errors as in the embodiments of FIGS. 6A and 6B.

Further, it is possible to select the delay times of the delay lines 3a to 3g to have other values than those shown in FIG. 8. In such case, it is of course desired that the sum of the delay times of the delay lines 3f and 3g, which is the maximum delay time, is selected as small as possible.

It will be apparent that many modifications and variations could be effected by one skilled in the art without departing from the scope or spirit of the present invention, which are to be determined by the appended claims.

What is claimed is:

1. In a digital transmission system in which a digital signal is transmitted in the form of digital words and in which at least first and second error correcting signals are included in the digital signal so transmitted, an encoding section comprising:

means for applying a sequence of selected ones of said words of the digital signal to a first channel and the remaining words to at least one further channel;

first adder means for adding a plurality of said words of the digital signal together with said second error correcting signal to produce said first error correcting signal;

delay means for delaying said remaining words of the digital signal by one amount of delay and for delaying said first error correcting signal by another amount of delay;

second adder means for adding at least one of the delayed words and the delayed first error correcting signal to produce said second error correcting signal;

feedback means for feeding said second error correcting signal back to said first adder means so that the latter adds said second error correcting signal together with said plurality of words of the digital signal to produce said first error correcting signal; and output means for providing said words of the digital signal, said delayed first error correcting signal and said second error correcting signal as the output of said encoding section to be transmitted.

2. A digital signal transmission system according to claim 1, wherein said first and second adder means include a modulo-N adder and a modulo-M adder, respectively, with N and M being whole numbers.

3. A digital signal transmission system according to claim 1, wherein each of said first and second adder means includes a modulo-two adder.

4. A digital signal transmission system according to claim 1, wherein said digital words and said first and second error correcting signals have respective error-detecting codes associated therewith.

5. A digital signal transmission system according to claim 1, further comprising means for interleaving said selected words of the digital signal, said delayed remaining words of the digital signal, said delayed first error correcting signal and said second error correcting signal with one another to form a signal group of interleaved digital words, and for associating with each said group a single error detecting code.

6. A digital signal transmission system according to claim 1, wherein said feedback means includes another delay means for delaying said second error correcting signal by a predetermined amount.

7. A digital signal transmission system according to claim 6, wherein the first-mentioned delayed means and said other delay means impart amounts of delay such that the difference between the amount of delay imparted to successive digital words ($W_{n-1}$, $W_n$) is unequal to the amount of delay imparted to immediately subsequent successive digital words ($W_n$, $W_{n+1}$).

8. A digital signal transmission system according to claim 6, wherein said encoding section further includes means for associating at least one error detecting code with said selected and delayed remaining words of the digital signal, said delayed first error correcting signal and said second error correcting signal in said output of the encoding section, said system further comprising a decoding section which includes first decoding means for receiving said output of the encoding section and decoding said selected and delayed remaining words of the digital signal by means of said delayed first error correcting signal and said second error correcting signal, whenever errors are indicated by said error detecting code;

second decoding means for receiving the decoded digital words from said first decoding means, and decoding said decoded digital words by means of said delayed first error correcting signal; and received delay means coupled between said first and second decoding means for imparting an amount of delay to said decoded digital words to compensate for the amount of delay imparted by the first-mentioned delay means and said other delay means.

9. A digital signal transmission system according to claim 8, wherein said receive delay means imparts an amount of delay to the decoded digital word containing said second error correcting said equal to the sum of the amount of delay imparted to the word containing said first error correcting signal by said first-mentioned delay means and the amount of delay imparted to the word containing said second error correcting signal by said other delay means.

10. A digital signal transmission system according to claim 1, wherein the transmitted words of the digital signal have at least one error detecting code associated therewith, said system further comprising, first decoding means for receiving said digital words and decoding the same by means of said first and second error correcting signals whenever errors are indicated by said error detecting code;

second decoding means for receiving, from the first decoding means, the decoded digital words and decoding the same by means of said first and second error correcting signals whenever errors are indicated by said error detecting code; and receive delay means coupled between said first and said second decoding means for imparting an amount of delay to said decoded digital words to compensate for the amount of delay imparted by the first-mentioned delay means.

* * * * *